United States Patent Office 3,547,594
Patented Dec. 15, 1970

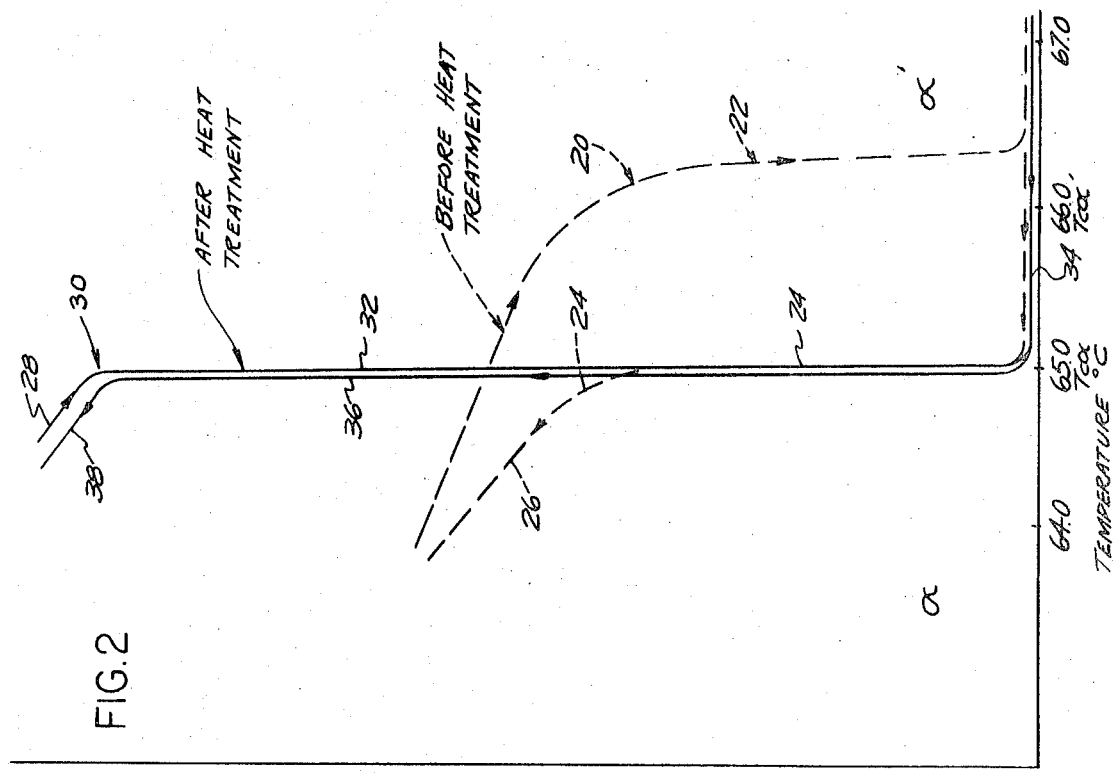
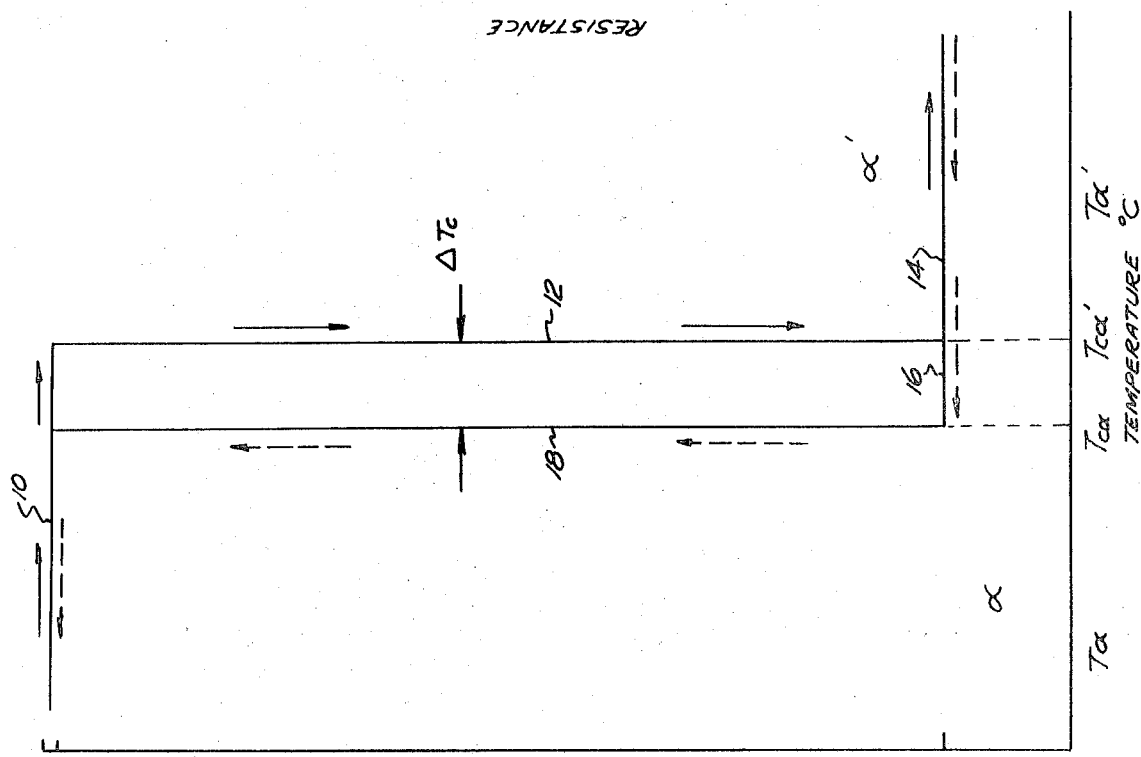
FIG. 2
FIG. 1
INVENTORS
ROBERT O. TEEG
ROBERT W. HALLMAN
BY Hacke, Kraus, Gifford, & Patalidis
ATTORNEYS

3,547,594
PROCESS FOR PRODUCING LOW THERMAL HYSTERESIS VANADIUM DIOXIDE
Robert O. Teeg, Grosse Pointe, and Robert W. Hallman, St. Clair Shores, Mich., assignors to Teeg Research, Inc., Detroit, Mich., a corporation of Delaware
Filed June 26, 1967, Ser. No. 648,712
Int. Cl. C01g *31/00*
U.S. Cl. 23—293          4 Claims

ABSTRACT OF THE DISCLOSURE

Vanadium dioxide in the form of crystals or thin film provided with a simple domain structure and exhibting a substantially reduced thermal hysteresis across its normal range of transition temperature. The low hysteresis vanadium dioxide is obtained by heat treatment of vanadium dioxide having conventional substantilly wide thermal hysteresis and exhibiting substantially more complex domain structure by repeated cycling through the transition temperature, upwardly and downwardly, for a predetermined number of cycles or until a less complex domain structure is achieved, or, alternately by heating at a high temperature and maintaining at such temperature under non-oxiding atmosphere for a predetermined period of time.

CROSS REFERENCE TO RELATED APPLICATIONS

The present application relates to vanadium dioxide products obtained by diverse processes, such as those disclosed in co-pending applications Ser. No. 358,065, filed Apr. 7, 1964, Vanadium Suboxide Thin Films and Processes for Preparing the Same, and Ser. No. 447,546, filed Apr. 12, 1965, Processes for Obtaining Vanadium Suboxides, for use in thermal detectors, sensors, imaging devices, and the like, as disclosed in co-pending applications, Ser. Nos. 379,609 and 379,610, filed July 1, 1964 and both entitled Invisible Radiation Imaging Devices, and in co-pending application S.N. 471,580, filed July 13, 1965, and entitled Thermal Control of Spacecraft and the Like.

BACKGROUND OF THE INVENTION

Field of the invention

The present invention reltes to vanadium dioxide of the general formula $VOx$, wherein $x$ is comprised substantially between 1.9 and 2.1, prepared according to the methods disclosed in the aforesaid co-pending applications, as well as to the methods of epitaxial growth by the decomposition of vanadium oxychloride as reported by Shigenao Koide and Humihiko Takei (J. Phys. Soc. Japan 22 (1967), pages 946–947 and J. Phys. Soc. Japan 21 (1966) p. 1010).

Vanadium dioxide prepared according to the invention is provided with substantially reduced thermal hysteresis through the transition temperature at which vanadium dioxide exhibits a sudden color change accompanied by sudden electrical resistivity change. Although the transition temperature of vanadium dioxide is in the neighborhood of 65° C., such transition is generally characterized by substantial hysteresis that causes the transition to be effected at a higher temperature when vanadium dioxide is heated from below its transition temperature to above its transition temperature and to be effected at a transition temperature lower by as much as 1.75° C. when cooled. The present invention relates to heat treatment of vanadium dioxide in crystalline bulk form or in crystalline thin film form for the purpose of reducing such thermal hysteresis range by several orders of magnitude.

Description of the prior art

The prior art known to applicants includes, in addition to the above cited communications in J. Phys. Soc. Japan, U.S. Pat. No. 3,149,298, entitled Neel Effect Switching Device, issued Sept. 15, 1964 to E. T. Handleman. In the prior art known to applicants, the thermal hysteresis of vanadium dioxide with respect to its transition temperature is either not discussed or simply ignored by researchers in the field, obviously due to the difficulties encountered in making precise temperature measurements over a short range and due to the fact that, for the applications contemplated, such thermal hysteresis does not present a critical problem.

For certain applications, thermal hysteresis of vanadium dioxide across its medium transition temperature is a desirable and valuable characteristic as it permits to obtain a material endowed with memory which will remain in a predetermined state, characterized by coloration or electrical resistivity, until thermally switched to a second state. However, for some other applications, such as thermal sensors, detectors or imaging devices, the thermal hysteresis of the material considerably reduces the practical effectiveness of precise instrumentation based upon the use of such material and often results in a lack of sensitivity, time constant and precise measurements. The disadvantages resulting from the use of high thermal hysteresis vanadium dioxide are cured by the present invention for most applications wherein such thermal hysteresis is undesirable, or are at least minimzed to the point of rendering practical devices such as indicators, sensors, imaging devices and the like which would otherwise be subject to great imprecision as to the information obtained thereby.

SUMMARY OF THE INVENTION

The principal object, therefore, of the present invention, is to provide vanadium dioxide having a thermal hysteresis across its transition temperature of an order of magnitude or several times smaller than the normal thermal hysteresis of vanadium dioxide as conventionally obtained.

Another object of the invention is to provide vanadium dioxide in a practical and useful form which is endowed with a simple domain structure, providing a low thermal hysteresis range.

A further object of the invention is to provide methods for heat treating vanadium dioxide in a bulk crystalline form or in a thin film form on a substrate for reducing the normal thermal hysteresis thereof by several orders of magnitude.

Yet another object of the present invention is to heat treat vanadium dioxide by way of successive upward and downward thermal cycles through the transition temperature thereof so as to substantially reduce the thermal hysteresis range thereof.

Yet a further object of the present invention is to heat treat vanadium dioxide for the purpose of reducing its normal thermal hysteresis by heating such vanadium dioxide to a predetermined temperature much higher than the transition temperature thereof, maintaining said vanadium dioxide at said temperature under a reduced atmosphere substantially neutral for a predetermined period of time, and cooling said vanadium dioxide to room temperature.

Other objects and advantages of the present invention will become apparent when the following description of the invention is read in conjunction with the accompanying drawings wherein:

BRIEF DESCRIPTION OF THE DRAWINGS

FIG. 1 is a graph showing an idealized typical vanadium dioxide thermal hysteresis curve across the transition temperature thereof, and representing electrical resistance of the vanadium dioxide in function of its temperature; and FIG. 2 is a graphic representation of vanadium dioxide thermal hysteresis about the transition temperature thereof, also showing the variation of resistance of a typical sample thereof in function of the temperature and comparing a typical hysteresis curve of vanadium dioxide before heat treatment with the hysteresis curve after heat treatment according to the present invention.

DETAILED DESCRIPTION OF THE PREFERRED EMBODIMENTS

Vanadium dioxide may be prepared in the form of a thin film on a substrate by evaporating vanadium pentoxide under reduced atmospheric pressure, for example, from $10^{-4}$ mm. Hg to $10^{-6}$ mm. Hg, at a temperature in the range of 500° C. to 850° C., condensating a thin film of evaporated vanadium pentoxide upon the substrate, and reducing the vanadium pentoxide thin film to vanadium dioxide at a temperature of about 400° C. to 600° C., under a pressure in the range of $10^{-1}$ to $10^{-4}$ mm. Hg in the presence of a reaction medium consisting of an appropriate stoichiometric amount of vanadium sesquioxide, or in the presence of a reaction medium selected from a group consisting of metal and metal oxides having greater affinity for oxygen than the vanadium pentoxide. Methods for preparing thin films of vanadium dioxide by such processes are described in detail in the aforesaid co-pending application S.N. 358,-065. In co-pending application S.N. 447,546, there are disclosed methods for obtaining vanadium dioxide crystals grown in vacuum from a vanadium pentoxide melt, and Shigenao Koide and Humihiko Takei have described, in the aforesaid communications through the J. Phys. Soc. Japan, techniques for epitaxial growth of vanadium dioxide single crystals. Vanadium dioxide of a composition in the range of $VO_{1.9}$ to $VO_{2.1}$ and more particularly vanadium dioxide near the composition $VO_{2.00}$, exhibits typical temperature dependent properties. On heating, the vanadium dioxide shows a marked change in optical property, such as absorption and reflectivity, when passing from a state below a critical temperature generally called transition temperature Tc, to another state above such transition temperature. The spectral transmissivity is greatly increased and the reflectivity is decreased above the transition temperature, and such change in transmissivity or reflectivity is evidenced by a sudden change in coloration of the vanadium dioxide.

Accompanying the sudden change in optical properties of vanadium dioxide when heated through the transition temperature, there is an abrupt drop in electrical resistivity of several orders of magnitude. Typically, such an abrupt change in optical property and electrical property of vanadium dioxide occurs on heating at a temperature which is higher by about .5 to 1.5° C., or more, than the temperature at which the inverse abrupt change occurs upon cooling.

FIG. 1 represents a typical idealized curve showing the electrical resistance of a vanadium dioxide single crystal specimen as a function of its temperature. When the crystal specimen is heated from a temperature below the transition temperature of vanadium dioxide to a temperature above the transition temperature, its electrical resistance which is substantially constant below the transition temperature drops, as shown by vertical portion 12 of the curve, to a much lower value, shown at portion 14, which remains substantially constant thereafter. The temperature at which the abrupt change in resistance occurs in the course of heating has been designated on FIG. 1 as temperature $Tc\alpha'$. The abrupt change of resistance, or resistivity corresponds to a change of state of the vanadium dioxide being converted upon heating from a first state or $\alpha$ state, below the critical temperature, to a second state or $\alpha'$ state, above the critical temperature. Such a change in state is confirmed by X-ray difraction measurements which indicate that below the critical temperature vanadium dioxide has substantially a monclinic structure when in the $\alpha$ sate, which is thermally converted at the transition temperature $Tc\alpha'$, into a similar tetragonal structure of the rutile type, or $\alpha'$ state. Such a change of state in crystalline structure is also demonstrated by Laue back reflection photograms of single crystals of vanadium dioxide showing that doublet Laue spots in at least one zone disappear suddenly upon heating when passing through the transition temperature.

Upon cooling the vanaium dioxide continues to exhibit a substantially low resistance even when cooled below temperature $Tc\alpha'$, as shown by portion 16 of the curve of FIG. 1. Upon reaching a temperature $Tc\alpha$, the resistance suddenly increases, as shown by portion 18 of the curve, to a value which is the normal value for vanadium dioxide below the transition temperature, or vanadium dioxide in the $\alpha$ state. The range separating the critical temperature upon heating, $Tc\alpha'$ from the critical temperature upon cooling, $Tc\alpha$ represents the thermal hysteresis of the vanadium dioxide and, as previously indicated, such thermal hysteresis may vary from specimen to specimen from .5° C. to 1.75° C., or greater in some instances, being generally in the neighborhood of 1° C.

The thermal hysteresis of vanadium dioxide presents obvious advantages for devices endowed with memory. A memory cell made of vanadium dioxide may be flipped from the $\alpha$ state to the $\alpha'$ state by heating beyond temperature $Tc\alpha'$, and when cooled to a temperature between $Tc\alpha'$ and $Tc\alpha$, it will remain in its $\alpha'$ state. Subsequent cooling below $Tc\alpha$, switches the cell to its $\alpha$ state at which it will remain even though the temperature of the cell is brought back to a temperature comprised between $Tc\alpha$ and $Tc\alpha'$. Subsequent heating beyond $Tc\alpha'$ will again switch the cell to its $\alpha'$ state, even though its temperature is brought back to an intermediate temperature between $Tc\alpha'$ and $Tc\alpha$. Consequently, all that is required is to maintain the cell within the hysteresis range between $Tc\alpha$ and $Tc\alpha'$, and to supply to it appropriate heat energy inputs for heating or cooling according to the quantitative representation of the bit to be recorded. The recorded bit is read by visual scanning (coloration of the cell) or by electrical means (resistivity).

However, for use in sensors, detectors or imaging devices of the type disclosed in the aforesaid co-pending applications, and for other purposes, it is desirable to obtain vanadium dioxide having a substantially precisely defined temperature of transition or temperature range of transition presenting no thermal hysteresis or presenting a very narrow hysteresis range such that the change from one state to the other is effected substantially over the same resistance-temperature curve during heat increase as well as during heat decrease. In order to obtain such low hysteresis vanadium dioxide the present invention provides for heat treatment of vanadium dioxide, as hereinafter explained in detail, so as to substantially reduce the thermal hysteresis, $\Delta Tc$ in FIG. 1, to an almost negligible value.

According to a first aspect of the invention, vanadium dioxide in a thin film monocrystalline or in a bulk form crystalline form and having a normal thermal hysteresis of about .5° C. to 1.75° C. is heated to a temperature of at least 550° C. in an oven, and maintained at such temperature in non-oxidizing and non-reducing atmosphere for a period of at least 24 hours, and preferably of at least 42 hours.

As shown in FIG. 2 by the dotted line curve designated generally at 20, a typical sample of vanadium dioxide has normally a thermal hysteresis range of more than 1° C. For example, when heated through its transition temperature, the specimen exhibits a sudden drop in resistance at approximately 66° C. to 66.45° C., as shown by portion 22 of the curve. During heating through the transition temperature, the abrupt increase in resistance occurs at a temperature between 65.05 and 64.70° C., as shown by portions 24 of the curve. For further decrease in temperature, the resistance further increases as shown by portion 26 of the curve. After heat treatment for 42 hours, in a partial vacuum at 550° C., the resistance of the specimen at temperature below the transition temperature is substantially increased, as compared to the resistance of the specimen before heat treatment, as shown by portion 28 of the full line curve shown generally at 30. Upon reaching the critical temperature of 65° C. during heating of the specimen, the electrical resistance drops in a step-wise fashion as shown by portion 32 of curve 30 to a much lower value, as shown by portion 34, which is substantially the same value as the resistance of the specimen in its α' state before heat treatment. Upon cooling of the heat treated specimen, the resistance thereof remains as such low value until the critical temperature of 65° C. is reached at which time the resistance increases suddenly as shown by the portion 36 of curve 30, until a resistance value as represented by portion 38 of the curve is reached above 65° C. showing that the specimen is now in its α state. The results achieved by several tests on several different specimens so heat treated reveal that as the result of the heat treatment, the transition temperature Tcα' upon heating tends to decrease while the transition temperature Tcα upon cooling remains substantially the same such that the thermal hysteresis is considerably reduced, to less than .1° C. in range, as compared to a normal thermal hysteresis before heat treatment, in a range of .5 to 1.75° C. After heat treatment of a duration of 24 hours, there is marked reduction of the vanadium dioxide thermal hysteresis such that the hysteresis has been reduced notably to below .3° C. in range.

The present invention also provides for reducing the normal thermal hysteresis of vanadium dioxide to a value below .3° C. after an alternate heat treatment consisting of thermally cycling vanadium dioxide through its transition temperature upwardly and downwardly for at least 200 cycles. After cycling through the transition temperature for at least 300 thermal cycles, thermal hysteresis was found never to exceed .1° C. The results achieved by thermal cycling are in all point comparable to the results achieved by continuous heat treatment at elevated temperature, and such decrease in thermal hysteresis of thermally cycled vanadium dioxide is represented graphically by the same graph of FIG. 2.

The thermal hysteresis of vanadium dioxide may seemingly be explained on the basis of domain wall movements occuring during the transitions from the α state to the α' state. Hysteresis exists as the result of an irreversible energy consumption process associated with a moving domain wall as it navigates through the crystal. Local lattice strain, dislocation, flaws, impurities and grain boundaries seem to create an impediment to the moving domain wall progression. This slowing down or impediment to the moving domain wall requires an additional energy input in order for the transition from one state to the other to occur. The effect of this condition is a resultant irreversible energy loss because of the hysteresis. The heat treatments, according to the methods of the invention, result in reducing the influence of the impediments causing hysteresis by considerably reducing local lattice strain. The preceding postulation seems to be borne out by examination of photomicrographs of sections of a single crystal of vanadium dioxide.

The photomicrographs show distinct differences in the domain patterns as exhibited before heat treatment and after heat treatment. Photomicrographs of vanadium dioxide specimens after heat treatment, according to the present invention, indicate a substantial simplification of the domain structure as compared to the domain structure of untreated specimens, such that vanadium dioxide, treated accordingly to the methods of the present invention, presents a simple domain structure with the accompanying decrease in thermal hysteresis.

It is thus seen that the invention provides simple methods for heat treating vanadium dioxide, and the like, such as to cause in such heat treated vanadium dioxide a substantially reduction in thermal hysteresis as compared to untreated vanadium dioxide. It is evident that, while the foregoing description sets forth the principles of the invention in connection with specific examples thereof, it is to be understood that the description is given only by way of example and not as a limitation of the scope of the invention as set forth in the accompanying claims.

What is claimed as new is:

1. A method for decreasing the normal thermal hysteresis range of more than .50° C. of vanadium dioxide comprising thermally cycling said vanadium dioxide upwardly and downwardly through its transition temperature at least through 200 cycles until a predetermined thermal hysteresis range of less than .30° C. is obtained for said vanadium dioxide.

2. The method of claim 1 wherein said vanadium dioxide is cycled through its transition temperature for at least 300 cycles for obtaining a thermal hysteresis range of less than .10° C. for said vanadium dioxide.

3. In the process of making vanadium dioxide having a thermal hysteresis of less than .30° C. between the upper and lower transition temperatures thereof the improvement which consists in consecutively heating and cooling said vanadium dioxide respectively above its upper and below its lower transition temperatures for at least 200 cycles.

4. The improvement of claim 3 wherein said heating and cooling is effected for at least 300 cycles.

References Cited

Sasaki, "Journal of the Physical Society (Japan)," vol. 19, 1964, p. 1748.

Van Steensel et al., "Philips Research Reports," vol. 22, April 1967, pp. 170–177.

Umeda et al., "Journal of the Physical Society (Japan)," vol. 21, 1966, pp. 1461–1462.

Bongers, "Solid State Communications," vol. 3, 1965, pp. 275–277.

Bongers et al., "Philips Research Reports," vol. 21, 1966, pp. 387–389.

Koide et al., "Journal of the Physical Society (Japan)," vol. 22, 1967, pp. 946–947.

Minomusa et al., "Journal of the Physical Society (Japan)," vol. 19, 1964, pp. 131–132.

HERBERT T. CARTER, Primary Examiner

U.S. Cl. X.R.

23—21, 29.5, 140

TRI-117-A

PO-1050
(5/69)

UNITED STATES PATENT OFFICE
CERTIFICATE OF CORRECTION

Patent No. 3,547,594　　　　Dated December 15, 1970

Inventor(s) ROBERT O. TEEG ET AL

It is certified that error appears in the above-identified patent and that said Letters Patent are hereby corrected as shown below:

IN THE SPECIFICATION

Column 1, line 26, change "non-oxiding" to - - non-oxidizing - -

Column 5, line 19, change "as" to - - at - -

Column 6, lines 16-17, change "substantially" to - - substantial - -

Signed and sealed this 23rd day of March 1971.

(SEAL)
Attest:

EDWARD M. FLETCHER, JR.
Attesting Officer

WILLIAM E. SCHUYLER, JR
Commissioner of Patents